US009842500B1

(12) United States Patent
Prasad et al.

(10) Patent No.: US 9,842,500 B1
(45) Date of Patent: Dec. 12, 2017

(54) WARNING SYSTEM FOR AN AUTOMATED VEHICLE

(71) Applicant: DELPHI TECHNOLOGIES, INC., Troy, MI (US)

(72) Inventors: Premchand Krishna Prasad, Carmel, IN (US); Robert J. Cashler, Kokomo, IN (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/177,985

(22) Filed: Jun. 9, 2016

(51) Int. Cl.
| G08G 1/16 | (2006.01) |
| H04B 1/38 | (2015.01) |
| H04L 29/08 | (2006.01) |
| H04W 4/02 | (2009.01) |
| G08G 1/056 | (2006.01) |
| G01S 19/13 | (2010.01) |
| G05D 1/00 | (2006.01) |

(52) U.S. Cl.
CPC ............ *G08G 1/162* (2013.01); *G01S 19/13* (2013.01); *G05D 1/0088* (2013.01); *G08G 1/056* (2013.01); *G08G 1/166* (2013.01); *G08G 1/167* (2013.01); *H04B 1/38* (2013.01); *H04L 67/12* (2013.01); *H04W 4/023* (2013.01)

(58) Field of Classification Search
CPC .......... G08G 1/16–1/167; G08G 1/056; G01S 13/931; G01S 17/936; G01S 19/13; B60Q 9/008; B60R 21/013; B60R 21/0134; B62D 15/025; B62D 15/0265; B62D 15/029; B60W 30/12; B60W 30/16; B60W 10/20; G05D 1/0088; H04B 1/38; H04L 67/12; H04W 4/023
USPC .................. 340/435, 903; 701/41–44, 93, 96
See application file for complete search history.

(56) References Cited

U.S. PATENT DOCUMENTS

| 2010/0253493 | A1* | 10/2010 | Szczerba | G01S 13/723 340/435 |
| 2012/0068859 | A1* | 3/2012 | Mochizuki | G08G 1/161 340/903 |
| 2012/0086582 | A1* | 4/2012 | Durekovic | G08G 1/161 340/903 |
| 2016/0225106 | A1* | 8/2016 | Shike | G06Q 50/08 |

* cited by examiner

Primary Examiner — Thomas Mullen
(74) Attorney, Agent, or Firm — Lawrence D. Hazelton

(57) ABSTRACT

A warning system for an automated vehicle includes an object-detector, a location-detector, a transceiver, and a controller. The object-detector is used to determine a separation-distance to a target-vehicle from a host-vehicle. The location-detector is used to provide global-positioning-system-coordinates (GPS-coordinates) of the target-vehicle. The transceiver is used to transmit a proximity-warning to the target-vehicle. The controller is in communication with the object-detector, the location-detector, and the transceiver. The controller is configured to operate the transceiver to transmit the proximity-warning when the separation-distance between the host-vehicle and the target-vehicle is less than a distance-threshold. The proximity-warning includes the GPS-coordinates of the target-vehicle and the separation-distance.

4 Claims, 2 Drawing Sheets

WARNING SYSTEM FOR AN AUTOMATED VEHICLE

TECHNICAL FIELD OF INVENTION

This disclosure generally relates to a warning system for an automated vehicle, and more particularly relates to a system that transmits a proximity-warning to a target-vehicle when a separation-distance between a host-vehicle and the target-vehicle is less than a distance-threshold, where the proximity-warning includes the GPS-coordinates of the target-vehicle and the separation-distance.

BACKGROUND OF INVENTION

It is known to equip vehicles with sensors to detect the proximity of other-vehicles, and issue a warning to an operator when any of the other-vehicles are too close. However, an undetected failure of a sensor and/or severe weather conditions and/or an unexpected traffic-scenario may lead to the warning not being issued.

SUMMARY OF THE INVENTION

In accordance with one embodiment, a warning system for an automated vehicle is provided. The system includes an object-detector, a location-detector, a transceiver, and a controller. The object-detector is used to determine a separation-distance to a target-vehicle from a host-vehicle. The location-detector is used to provide global-positioning-system-coordinates (GPS-coordinates) of the target-vehicle. The transceiver is used to transmit a proximity-warning to the target-vehicle. The controller is in communication with the object-detector, the location-detector, and the transceiver. The controller is configured to operate the transceiver to transmit the proximity-warning when the separation-distance between the host-vehicle and the target-vehicle is less than a distance-threshold. The proximity-warning includes the GPS-coordinates of the target-vehicle and the separation-distance.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
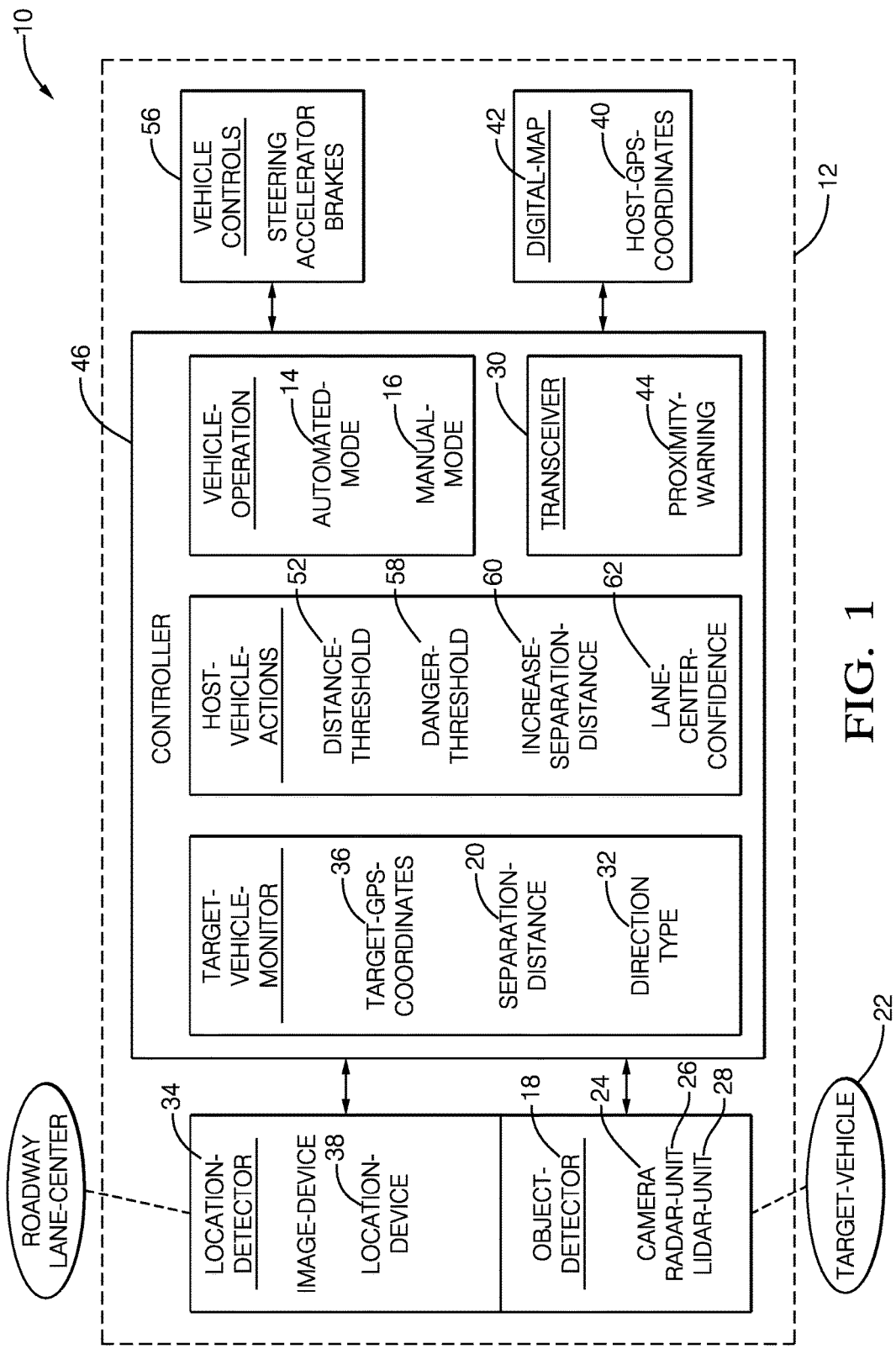
FIG. 1 is diagram of a warning system in accordance with one embodiment.

FIG. 1 illustrates a non-limiting example of a warning system 10, hereafter referred to as the system 10, which is generally configured for use by an automated vehicle, for example a host-vehicle 12. The examples presented herein are generally directed to instances when the host-vehicle 12 is being operated in an automated-mode 14, i.e. a fully autonomous mode, where a human operator (not shown) of the host-vehicle 12 does little more than designate a destination to operate the host-vehicle 12. However, it is contemplated that the teachings presented can be applied to instances when the host-vehicle 12 is operated in a manual-mode 16 where the degree or level of automation may be little more than providing steering advice to the human operator who is generally in control of the steering, accelerator, and brakes of the host-vehicle 12, i.e. the system 10 merely assists the human operator on an as-needed basis to reach the destination and/or avoid a collision.

The system 10 includes an object-detector 18 used to determine a separation-distance 20 to a target-vehicle 22 from a host-vehicle 12. As will be explained in more detail below, the system 10 is generally configured to take some sort of action if the target-vehicle 22 gets too close to the host-vehicle 12, hence the need for the object-detector 18 to determine the separation distance 20, and optionally determine a direction 32 from the host-vehicle 12 to the target-vehicle 22. That is, the object-detector 18 may also be used to determine a direction 32 to the target-vehicle 22 from the host-vehicle 12 in addition to being used to determine the separation-distance 20. The usefulness of the separation-distance 20 and the direction 32 will be explained later in this disclosure. It is also contemplated that the system 10 can be used when the host-vehicle is operated in the manual-mode 16, where the host-vehicle 12 still senses the separation-distance 20.

The function of the object-detector 18 may be provided by a camera 24, a radar-unit 26, a lidar-unit 28, an ultrasonic transducer (not shown), or any combination thereof. The function of the object-detector 18 may also be provided by or supplemented by a transceiver 30 configured for vehicle-to-infrastructure (V2I) communications, vehicle-to-vehicle (V2V) communications, and/or vehicle-to-pedestrian (V2P) communications, which may be generically referred to as V2X communications, as will be recognized by those in the art.

The system 10 includes a location-detector 34 used to provide global-positioning-system-coordinates, hereafter referred to as the GPS-coordinates 36, of the target-vehicle 22. In one embodiment envisioned, the location-detector 34 may include a location-device 38, such as GPS-receiver, which is mounted on the host-vehicle 12 and used to determine the host-coordinates 40 (i.e. GPS coordinates) of the host-vehicle 12. The host-coordinates 40 can be used to determine a location on a digital-map 42, the usefulness of which will be explained later, and/or can be used to determine the GPS-coordinates 36 of the target-vehicle 22 by offsetting the host-coordinates 40 in accordance with the separation-distance 20 and the direction 32. Alternatively, the target-vehicle 22 may be equipped with a GPS-receiver and may broadcast the GPS-coordinates 36 of the target-vehicle 22 using, for example, V2V communications. As another alternative, the GPS-coordinates 36 may be determined and provided by traffic-monitoring equipment via V2I communications. Furthermore, it is contemplated that an imaging-device such as the camera 24, the radar-unit 26, and/or the lidar-unit 28 could be used to determine the host-coordinates 40 of the host-vehicle 12 and/or the GPS-coordinates 36 of the target-vehicle based on navigation-feature matching to the digital-map 42.

As noted above, the system 10 includes the transceiver 30 which is used by the system 10 to transmit a proximity-warning 44 to the target-vehicle 22, but the transceiver 30 is not limited to only this use. That is, the transceiver 30 may be used to transmit other-messages to recipients other than the target-vehicle 22. The transceiver 30 may transmit and receive messages using radio-frequency (RF) signals in accordance with known V2X protocols. Alternatively, the transceiver 30 may use infrared (IR) light to transmit the proximity-warning 44 as the distance that the proximity-warning 44 must travel is expected to be rather short, e.g. less than twenty-five meters (25 m).

The system 10 includes a controller 46 in communication with the object-detector 18, the location-detector 34, and the transceiver 30. The communication may be by way of wires, wireless communication, or optical-fiber, as will be recognized by those in the art. The controller 46 may include a processor (not specifically shown) such as a microprocessor or other control circuitry such as analog and/or digital control circuitry including an application specific integrated circuit (ASIC) for processing data as should be evident to those in the art. The controller 46 may include memory (not specifically shown), including non-volatile memory, such as electrically erasable programmable read-only memory (EEPROM) for storing one or more routines, thresholds, and captured data. The one or more routines may be executed by the processor to perform steps for determining, for example, if a present-vector 48 of the target-vehicle 22 suggests that some action by the host-vehicle 12 and/or the other-vehicle 50 (FIG. 2) is necessary to avoid a collision based on signals received by the controller 46 from the object-detector 18 as described herein.

In particular, the controller 46 is configured to operate the transceiver 30 to transmit the proximity-warning 44 when the separation-distance 20 between the host-vehicle 12 and the target-vehicle 22 is less than a distance-threshold 52, one meter (1 m) for example. Advantageously, the proximity-warning 44 communicates or includes the GPS-coordinates 36 of the target-vehicle 22, and the separation-distance 20, as including the GPS-coordinates 36 in the message (the proximity-warning 44) will help to notify the target-vehicle 22 that corrective action by the target-vehicle 22 is necessary to avoid a possible collision. That is, the target-vehicle 22 will be able to determine that the proximity-warning 44 is directed at the target-vehicle 22. A further advantage of including the GPS-coordinates 36 of the target-vehicle 22 in the proximity-warning 44 is that the other-vehicle 50 and/or any other vehicles not shown in FIG. 2 but close enough to benefit from being notified that the target-vehicle 22 is too close to the host-vehicle 12. The advantage may be that the other-vehicle 50 and/or any other vehicles not shown in FIG. 2 may take some preemptive action in case a collision between the target-vehicle 22 and the host-vehicle 12 do collide, and/or make room for the host-vehicle 12 to take some evasive action if the target-vehicle fails to respond accordingly to the proximity-warning 44.

It is also contemplated that the proximity-warning 44 may include the direction 32 and/or the host-coordinates 40 as this may help the target-vehicle 22 and/or any other vehicles determine who (i.e. which vehicle) is transmitting the proximity-warning 44. For example, the direction 32 may give the target-vehicle 22 an instant indication of which direction the target-vehicle 22 should steer to avoid being too close to another vehicle (i.e. the host-vehicle 12). Making quick use of the instant indication may be preferable rather than use the sensors of the target-vehicle 22 to determine why the proximity-warning 44 has been issued as there is some evidence that those sensors are not performing adequately.

Figure 2:
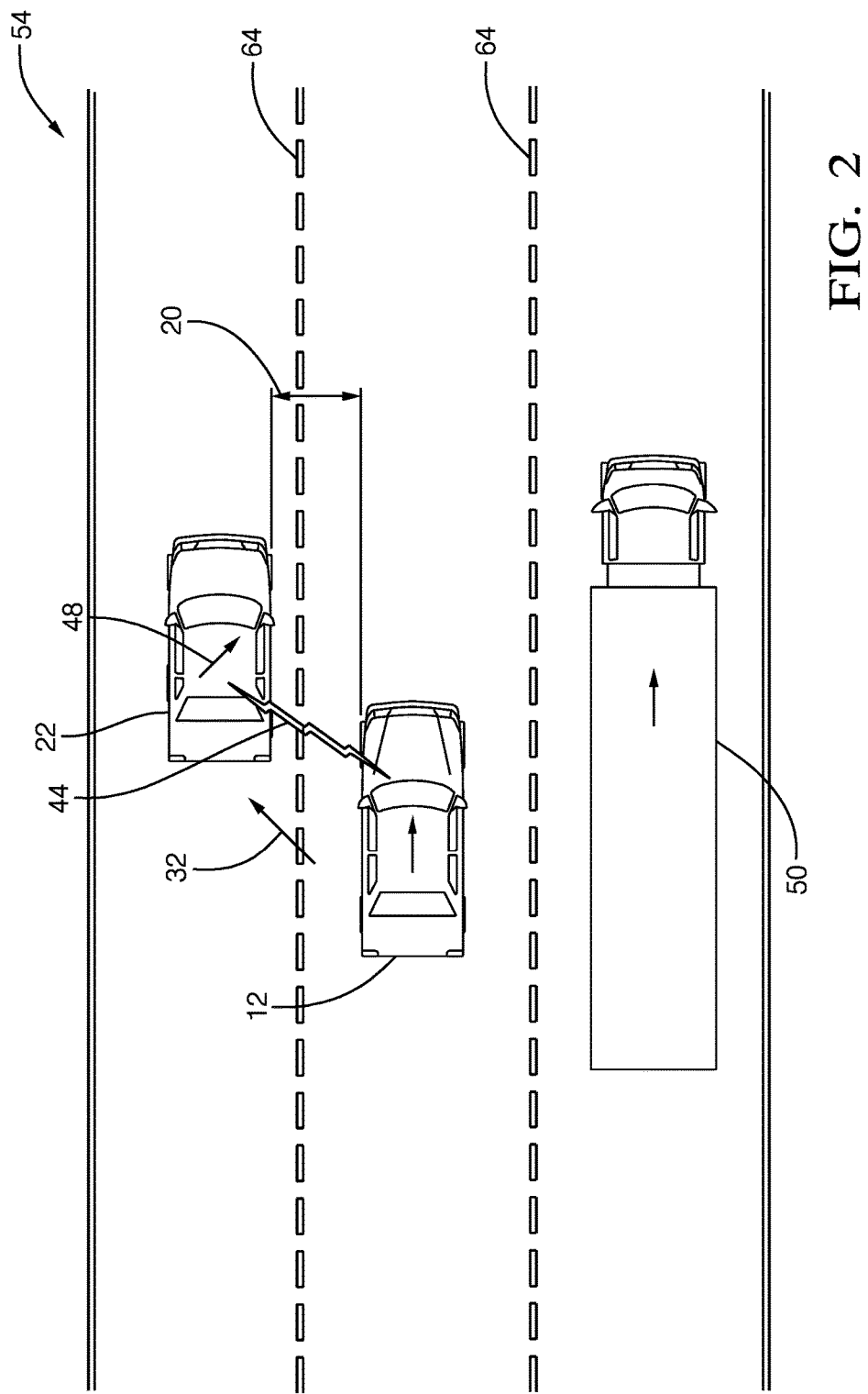
FIG. 2 is a traffic-scenario encountered by the system of FIG. 1 in accordance with one embodiment.

FIG. 2 illustrates a non-limiting example of a traffic-scenario 54 where the present-vector 48 of the target-vehicle 22 indicates that the target-vehicle 22 is drifting toward or changing lanes into the host-vehicle 12. While the illustration suggests that the separation-distance 20 is determined or measured in a lateral-direction, it is contemplated that the separation-distance 20 may alternatively be measured in a longitudinal-direction, or some direction therebetween, i.e. a diagonal-direction. If the separation-distance 20 becomes less than the distance-threshold 52 (FIG. 1), the proximity-warning 44 is transmitted by the host-vehicle 12 to warn the target-vehicle 22 about the situation. The expectation is that the target-vehicle 22 will respond by changing the present-vector 48 of the target-vehicle 22 to steer away from the host-vehicle 12. However, if the target-vehicle 22 continues to travel towards the host-vehicle 12, the host-vehicle 12 may need to take some additional action.

The controller 46 may also be in communication with vehicle-controls 56 of the host-vehicle 12. By way of example and not limitation, the controller 46 may be configured to operate the host-vehicle 12 to increase 60 the separation-distance 20 after proximity-warning 44 is transmitted and the separation-distance 20 is less than a danger-threshold 58, one-half-meter (0.5 m) for example, and noting that the danger-threshold 58 is less than the distance-threshold 52. That is, the system 10, or more specifically the controller 46, may take evasive action, possibly taking control away from a human-operator (not shown) of the host-vehicle 12, only after the danger-threshold 58 is violated, where the danger-threshold 58 is closer that the distance-threshold 52 which causes transmission of the proximity-warning 44. For the traffic-scenario 54, the evasive action may include, but is not limited to, braking and/or steering the host-vehicle 12 closer to the other-vehicle 50. It is contemplated that steering the host-vehicle 12 closer to the other-vehicle 50 may cause the other-vehicle 50 to transmit another proximity-warning (not shown) and/or steer the other-vehicle 50 away from the host-vehicle 12.

It is contemplated that the controller 46 may be programmed with predetermined values for the distance-threshold 52 and/or the danger-threshold. However, it is recognized that these values may need to be adjusted depending on a variety of factors such as speed, traffic-density, weather-conditions, etc. By way of example and not limitation, the controller 46 may be further configured to determine a lane-center-confidence 62 of the host-vehicle, and determine the distance-threshold 52 and/or the danger-threshold 58 based on the lane-center-confidence 62. For example, if the lane-markings 64 (FIG. 2) have been consistently detected for a relatively long period of time, more than eight seconds (8 s) for example, and the host-vehicle 12 is centered between the lane-markings 64, then the lane-center-confidence is relatively high and there should be less need for the host-vehicle 12 to take evasive action. As such, if the lane-center-confidence is high, the exemplary value for the danger-threshold 58 of 0.5 m is likely acceptable. However, if the if the lane-center-confidence is relatively low because the lane-markings 64 (FIG. 2) have not been consistently detected and/or have been detected for a relatively short period of time, less than three seconds (3 s) for example, the value of the danger-threshold 58 may be justifiably increased so the host-vehicle 12 considers making an evasive maneuver sooner when the target-vehicle 22 and the host-vehicle 12 approach each other.

Accordingly, a warning system (the system 10), a controller 46 for the system 10, and a method of operating the system 10 is provided. The system 10 is generally configured so that when the cause of the target-vehicle 22 being too close to the host-vehicle 12 is apparently the fault of the target-vehicle 22, a proximity-warning 44 is transmitted to warn the target-vehicle 22 (or the operator of the target-vehicle 22) to move away from the host-vehicle 12. If transmitting the proximity-warning 44 is not effective to have the target-vehicle 22 change course, then the host-vehicle 12 may take evasive action as a last resort.

While this invention has been described in terms of the preferred embodiments thereof, it is not intended to be so limited, but rather only to the extent set forth in the claims that follow.

We claim:

1. A warning system for an automated vehicle, said system comprising:
   an object-detector used to determine a separation-distance to a target-vehicle from a host-vehicle;
   a location-detector used to provide global-positioning-system-coordinates (GPS-coordinates) of the target-vehicle;
   a transceiver used to transmit a proximity-warning to the target-vehicle; and
   a controller in communication with the object-detector, the location-detector, and the transceiver, said controller configured to operate the transceiver to transmit the proximity-warning when the separation-distance between the host-vehicle and the target-vehicle is less than a distance-threshold, wherein the proximity-warning includes the GPS-coordinates of the target-vehicle and the separation-distance.

2. The system in accordance with claim 1, wherein the object-detector is used to determine a direction to the target-vehicle from the host-vehicle, and the proximity-warning includes the direction.

3. The system in accordance with claim 1, wherein the controller is in communication with vehicle-controls of the host-vehicle, and the controller operates the host-vehicle to increase the separation-distance after proximity-warning is transmitted and the separation-distance is less than a danger-threshold that is less than the distance-threshold.

4. The system in accordance with claim 3, wherein the controller is further configured to determine a lane-center-confidence of the host-vehicle, and determine the danger-threshold based on the lane-center-confidence.

* * * * *